United States Patent
Okuno

[11] Patent Number: 6,006,044
[45] Date of Patent: Dec. 21, 1999

[54] CAMERA

[75] Inventor: Ryoji Okuno, Yokohama, Japan

[73] Assignee: Canon Kabushiki Kaisha, Tokyo, Japan

[21] Appl. No.: 08/951,271

[22] Filed: Oct. 16, 1997

Related U.S. Application Data

[63] Continuation of application No. 08/799,622, Feb. 12, 1997, abandoned.

[30] Foreign Application Priority Data

Feb. 19, 1996 [JP] Japan .................................. 8-030924

[51] Int. Cl.$^6$ .................................................. G03B 17/02
[52] U.S. Cl. .......................... 396/538; 396/440; 396/529; 396/535
[58] Field of Search ................................ 396/415, 440, 396/529, 535, 538, 411, 349

[56] References Cited

U.S. PATENT DOCUMENTS

| | | | |
|---|---|---|---|
| 3,387,546 | 6/1968 | Winkler et al. | 396/415 |
| 4,440,483 | 4/1984 | Linke et al. | 396/415 |
| 4,728,977 | 3/1988 | Yomogizawa et al. | 396/535 |
| 5,075,707 | 12/1991 | Shibayama et al. | 396/411 |
| 5,363,166 | 11/1994 | Takahashi et al. | 396/538 |
| 5,521,668 | 5/1996 | Ezawa | 396/538 |
| 5,585,876 | 12/1996 | Kobayashi | 396/440 |
| 5,758,211 | 5/1998 | Miyamoto | 396/535 |

FOREIGN PATENT DOCUMENTS

| | | |
|---|---|---|
| 4175741 | 7/1966 | Japan . |
| 6175206 | 1/1986 | Japan . |
| 6258700 | 12/1987 | Japan . |
| 728154 | 1/1995 | Japan . |

*Primary Examiner*—Alan A. Mathews
*Attorney, Agent, or Firm*—Robin, Blecker & Daley

[57] ABSTRACT

A camera comprises a cartridge chamber for loading therein an image recording medium cartridge, an image recording medium accommodating chamber for accommodating therein an image recording medium sent out from the image recording medium cartridge, a lens barrel constituting a part of at least one wall of a wall constituting the cartridge chamber and a wall constituting the image recording medium accommodating chamber, and a positioning portion, molded integrally with a camera body, for positioning the image recording medium at a photo-taking aperture position.

14 Claims, 5 Drawing Sheets

CAMERA

This is a continuation application under 37 CFR 1.62 of prior application Ser. No. 08/799,622, filed Feb. 12, 1997, now abandoned.

BACKGROUND OF THE INVENTION

1. Field of the Invention

This invention relates to an improvement of a camera in respect of a reduction in size of the camera.

2. Description of Related Art

There has been known a camera in which a wall part surrounding a spool chamber is formed in a camera body and a roller spring attached to the wall part is arranged to press a film against a spool, as proposed in Japanese Laid-Open Patent Application No. HEI 4-349443, etc.

FIG. 5 is a transverse sectional view schematically showing a spool chamber of the conventional camera of the above-stated kind. The illustration includes a camera body 1 and a spool chamber wall 1a formed in the camera body 1. A groove part 1b is formed in the spool chamber wall 1a and arranged to hold a camera-body-side roller spring 8 which is press-fitted into the groove part 1b.

A spool chamber 2 is arranged to accommodate a photographing film 9 there in an encircling manner. A film take-up spool 3 which is disposed within the spool chamber 2 is arranged to be driven to rotate during film winding and to idly rotate during film rewinding by a film transport means (not shown).

A back cover 5 is arranged to shield from light an aperture part 1c formed in the camera body 1 and the spool chamber 2. A back-cover-side roller spring 4 which is mounted on the back cover 5, is arranged to press the photographing film 9 against the spool 3.

A fixed tube 6 constitutes an outermost peripheral part of a photo-taking lens barrel. A photo-taking lens barrel unit 7 is stowed in the fixed tube 6. The camera-body-side roller spring 8 is arranged to press the photographing film 9 against the spool 3. At the time of assembling of the camera, the camera-body-side roller spring 8 is made to be inserted into the spool chamber 2 from the direction of the back cover 5 and to be press-fitted into the groove part 1b formed in the camera body 1.

An inner rail 1d, which is molded integrally with the camera body 1 is arranged to regulate the position of the photographing film 9 on the front side thereof in the direction of an optical axis within a film transport path formed between the back cover 5 and the camera body 1.

Next, movement of the photographing film 9 in the camera configured as described above is discussed. The photographing film 9 which has been sent out from a film cartridge by the film transport means (not shown) passes through the film transport path and then enters the spool chamber 2. With the photographing film 9 further sent out, the fore end of the photographing film 9 comes to abut on the back-cover-side roller spring 4 to be pressed against the spool 3. When the spool 3 is caused to rotate, in this state, in the direction of film winding (clockwise as viewed in FIG. 5), the photographing film 9 begins to be wound around the spool 3 due to friction brought about by the pressing force of the back-cover-side roller spring 4.

When the photographing film 9 is further sent out, the photographing film 9 is guided between the wall surface of the spool chamber 2 and the camera-body-side roller spring 8. Then, as shown in FIG. 5, the photographing film 9 is sandwiched between the camera-body-side roller spring 8 and the spool 3 to be taken up onto the spool 3. When the photographing film 9 has been wound on the spool 3 to the extent of a maximum number of photographing frames, the camera-body-side roller spring 8 is elastically deformed up to a position 8a shown in FIG. 5.

While the camera shown in FIG. 5 includes the camera-body-side roller spring 8, some cameras are provided with no camera-body-side roller spring, as shown in FIG. 6.

Referring to FIG. 6, a rib 10 which protrudes into the spool chamber 2, is arranged to prevent the photographing film 9 from falling in between the spool 3 and the spool chamber wall surface on the side of the lens barrel, to prevent light from easily entering into the spool chamber 2 through the aperture part in the event of an excessive amount of exposure, and also to cause the photographing film 9 to have a better flatness at the aperture part.

In each of the cameras shown in FIGS. 5 and 6 a part of a camera body on the front side of the camera, i.e., the spool chamber wall 1a located on the side of the lens barrel, and a part of a photographing lens barrel, i.e., the fixed tube 6 are disposed side by side in the transverse direction of the camera. Such a side-by-side arrangement presents a problem in terms of a reduction in size of the camera, because of an increase in the transverse dimension of the camera.

Further, as shown in FIG. 5, in a case where the camera body 1 is to be molded by pulling out a mold in the direction of the back cover 5 the groove 1b which is to be used for press-fitting the camera-body-side roller spring 8 can be formed only in a position where it laterally overlaps the spool chamber wall 1a. Therefore, the groove 1b also hinders the reduction in size of the camera in its transverse direction.

Further, as shown in FIG. 6, in a case where the camera body 1 is to be molded by pulling out a mold in the direction of the back cover 5, it is extremely difficult to have the rib 10, which protrudes into the spool chamber 2, molded integrally with the camera body 1. The rib 10 therefore, has to be molded separately from the camera body 1. The two parts, i.e., the rib 10 and the camera body 1, then necessitate a process of joining them together at the time of assembling of the camera. This process causes an increase in cost of the camera.

In addition, in a case where the rib 10 shown in FIG. 6 is attempted to be molded integrally with the camera body 1 shown in FIG. 5, even if they can be molded integrally, it becomes extremely difficult to have the camera-body-side roller spring 8 embedded or incorporated into the camera body 1 as shown in FIG. 5. Besides, the work of embedding the camera-body-side roller spring 8 in the camera body 1 becomes more difficult accordingly as the camera-body-side roller spring 8 is arranged to be closer to the spool chamber wall 1a. At present, therefore, the rib 10 has to be molded separately from the camera body 1.

BRIEF SUMMARY OF THE INVENTION

In accordance with one aspect of this invention, there is provided a camera which comprises a cartridge chamber for loading therein an image recording medium cartridge, an image recording medium accommodating chamber for accommodating therein an image recording medium sent out from the image recording medium cartridge, a lens barrel constituting a part of at least one wall of a wall constituting the cartridge chamber and a wall constituting the image recording medium accommodating chamber, and a positioning portion, molded integrally with a camera body, for positioning the image recording medium at a photo-taking aperture position, so that a reduction in size of the camera and a positioning accuracy of the image recording medium at the photo-taking aperture position can be assured.

The above and other aspects and features of this invention will become apparent from the following detailed description of embodiments thereof taken in connection with the accompanying drawings.

DETAILED DESCRIPTION OF THE INVENTION

Preferred embodiments of this invention will be described below in detail with reference to the accompanying drawings.

Figure 1:
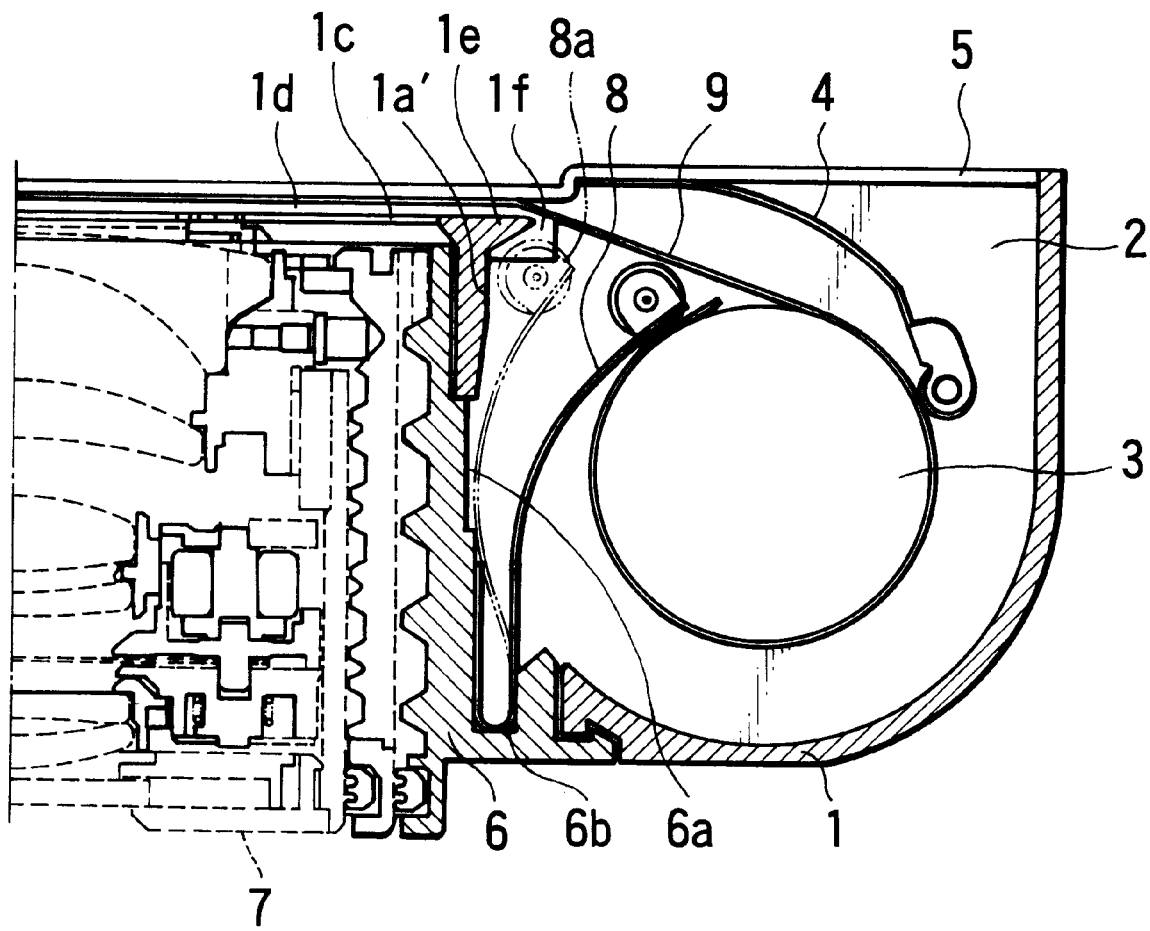
FIG. 1 is a transverse sectional view showing a camera according to a first embodiment of this invention.
Figure 5:
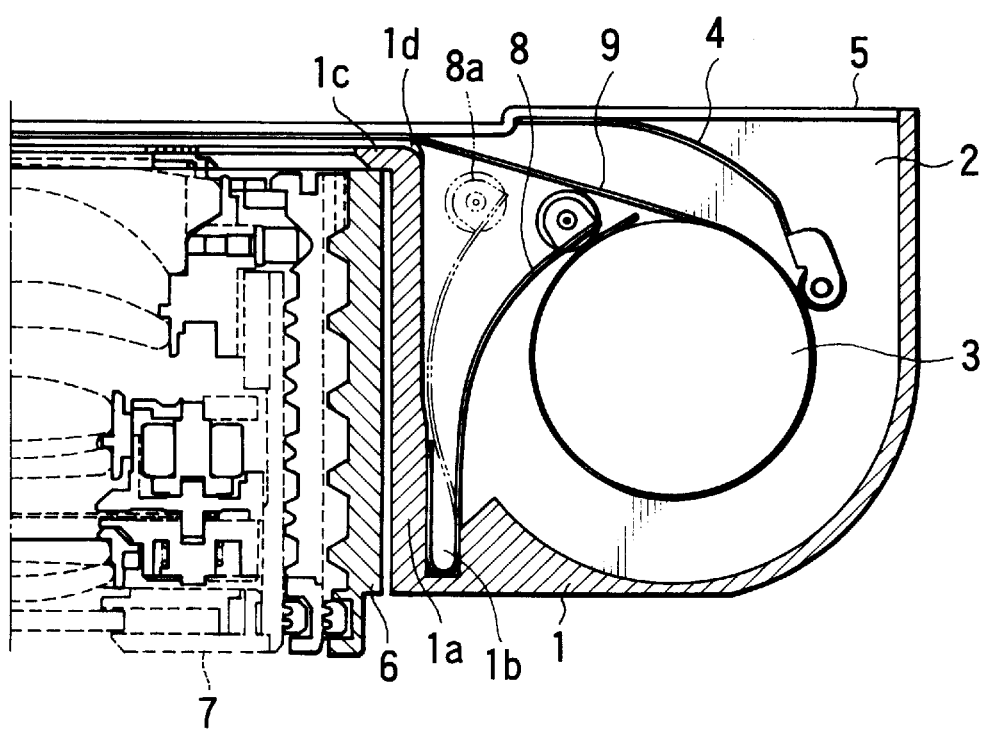
FIG. 5 is a transverse sectional view showing a conventional camera.

FIG. 1 shows in a transverse sectional view a camera according to a first embodiment of this invention. In FIG. 1, all parts arranged in the same manner as the parts shown in FIG. 5 are indicated by the same reference numerals as in FIG. 5.

Referring to FIG. 1, a fixed tube 6 which is a part of a photo-taking lens barrel, is provided with a spool chamber wall part 6a which forms a part of a wall surrounding a spool chamber 2, and a press-fitting groove part 6b which is provided for press-fitting therein a camera-body-side roller spring 8. In other words, a part of the wall surrounding the spool chamber 2 is cut out and is replaced with the spool chamber wall part 6a of the fixed tube 6.

The spool chamber wall part 6a of the fixed tube 6 is arranged to have a thickness which is just enough for forming a female helicoid part therein on the side of the lens barrel for mounting the lens barrel thereon. The fixed tube 6 therefore, can be arranged to have a small outside diameter. With an outer circumferential wall part of the fixed tube 6 used as the spool chamber wall part 6a, the transverse dimension of the camera can be minimized.

In FIG. 1, reference numeral 1a' denotes a light-blocking wall formed in the camera body 1 to prevent light from entering the spool chamber 2 directly from between the fixed tube 6 and an aperture part 1c which is provided for exposing the photographing film 9 to light.

With the camera configured in the above manner, when the photographing film 9 has been taken up onto a spool 3 to the extent of all frame portions, a camera-body-side roller spring 8 is in a position located close to the fixed tube 6 as shown by two-dot chain lines 8a in FIG. 1. In this state, a spring part of the camera-body-side roller spring 8 is located closer to the fixed tube 6 than the light-blocking wall 1a'.

Thus, in this embodiment, not only a part of the spool chamber forming wall of the camera body 1 is cut out, but also a space obtained by cutting out that part is effectively utilized as a retreating space for allowing the camera-body-side roller spring 8 to retreat.

Reference numeral 1e denotes a light-blocking rib formed in the camera body 1 to protrude into the spool chamber 2 in such a way as to prevent a leak of light from the aperture part 1c into the spool chamber 2 through a film transport path. The light-blocking rib 1e is arranged to provide a space on the side of the spool chamber 2 for allowing a roller part of the camera-body-side roller spring 8 to rotate when the roller part and a roller support part of the camera-body-side roller spring 8 enter that space.

An inner rail 1d is also formed in the camera body 1 to regulate the position of the photographing film 9 on the front side of the photo-taking optical axis at the aperture part 1c within the film transport path. The inner rail 1d is provided with an extension part 1f which protrudes into the spool chamber 2.

In a case where the spool chamber 2 is formed close to the photo-taking optical axis as in this embodiment, if the inner rail 1d is made to extend even to a slight extent, a leak of light into the spool chamber 2 from the aperture part 1c can be effectively prevented and also the flatness of the photographing film 9 can be ensured. Further, since the extension part 1f of the inner rail 1d protrudes into the spool chamber 2, the photographing film 9 is prevented from falling into a space between the camera-body-side roller spring 8 and the light-blocking wall 1a' instead of being sent into a gap between the back-cover-side roller spring 3 and the spool 3 from the film transport path, in the initial stage of film transport, so that a film transport action can be carried out without fail.

Figure 2:
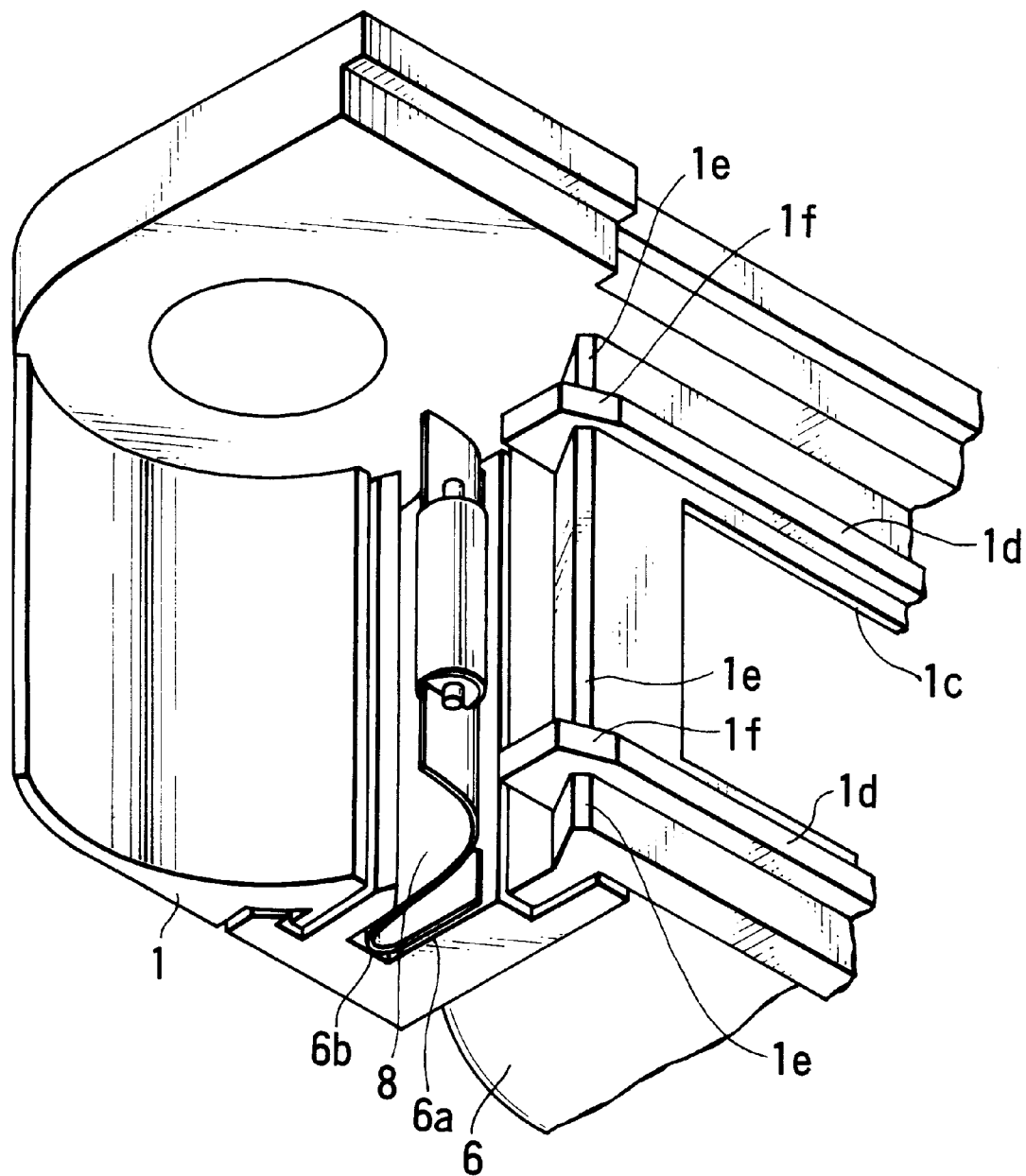
FIG. 2 is a perspective, partially sectional view of the camera shown in FIG. 1.

FIG. 2 shows in a perspective, partially sectional view the camera in this embodiment as viewed from the rear side thereof. The rib 1e and the inner rail extension part 1f respectively have upper and lower parts symmetrically arranged to extend to the upper and lower sides of the spool chamber 2. The structure of the camera body 1 around the spool chamber 2 is thus strengthened by the rib 1e and the inner rail extension part 1f.

The camera-body-side roller spring 8 is arranged to be embedded and incorporated into the camera body from the front side of the camera body 1 (from its lower side in FIG. 1) in a state of being press-fitted into the groove part 6b of the fixed tube 6 which is a part of the photo-taking lens barrel. Therefore, this arrangement presents no problem for assembly work although the light-blocking rib 1e and the inner rail extension part 1f protrude into the spool chamber 2.

The light-blocking rib 1e and the inner rail extension part 1f can be easily molded integrally with the camera body 1, because a mold can be extracted forward through the cutout wall part from the spool chamber 2 of the camera body 1. If the mold is to be extracted rearward from the camera body 1 as in the case of the conventional arrangement, the light-blocking rib 1e and the inner rail extension part 1f would hinder the mold from being extracted, thereby requiring these parts to be separately formed and to be mounted on the camera body 1 after the camera body 1 is molded. Thus, the conventional arrangement causes an increase in cost. According to the arrangement of this embodiment, on the other hand, the mold can be extracted forward from the camera body 1 through the cutout wall part of the spool chamber 2, so that the light-blocking rib 1e and the inner rail extension part 1f can be molded integrally with the camera body 1, thereby attaining a reduction in cost of the camera.

Figure 3:
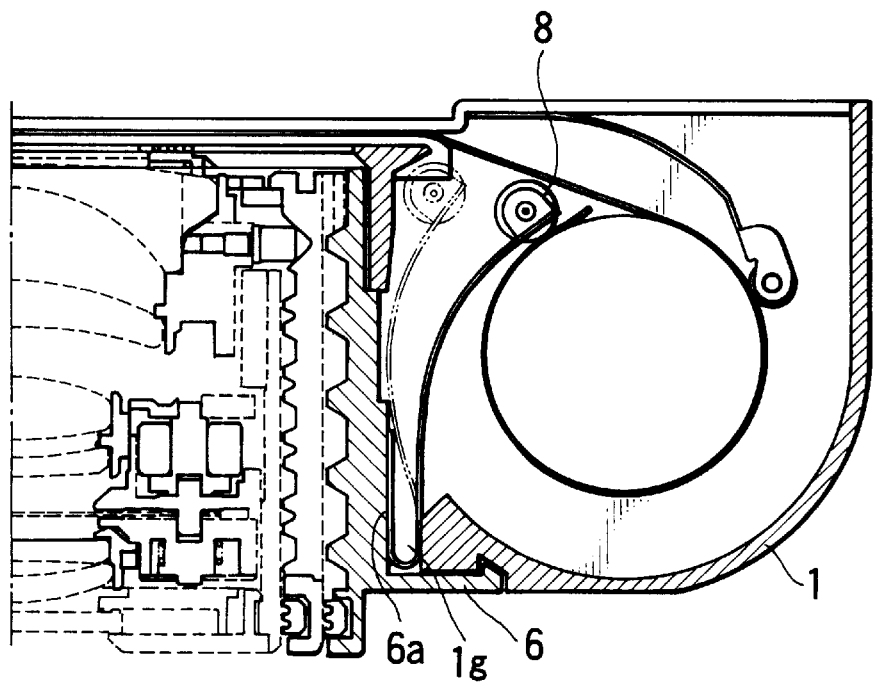
FIG. 3 is a transverse sectional view showing a camera according to a second embodiment of this invention.

FIG. 3 shows in a transverse sectional view a camera according to a second embodiment of this invention. The parts of the second embodiment arranged in the same manner as those of the first embodiment shown in FIG. 1 are indicated by the same reference numerals as those of FIG. 1.

Referring to FIG. 3, reference numeral 1g denotes a gap which is formed jointly by the camera body 1 and the fixed tube 6 and is arranged to allow the camera-body-side roller spring 8 to be pinched by the camera body 1 and the fixed tube 6. The camera-body-side roller spring 8 is press-fitted into the gap 1g after the fixed tube 6 is embedded in the camera body 1.

Figure 4:
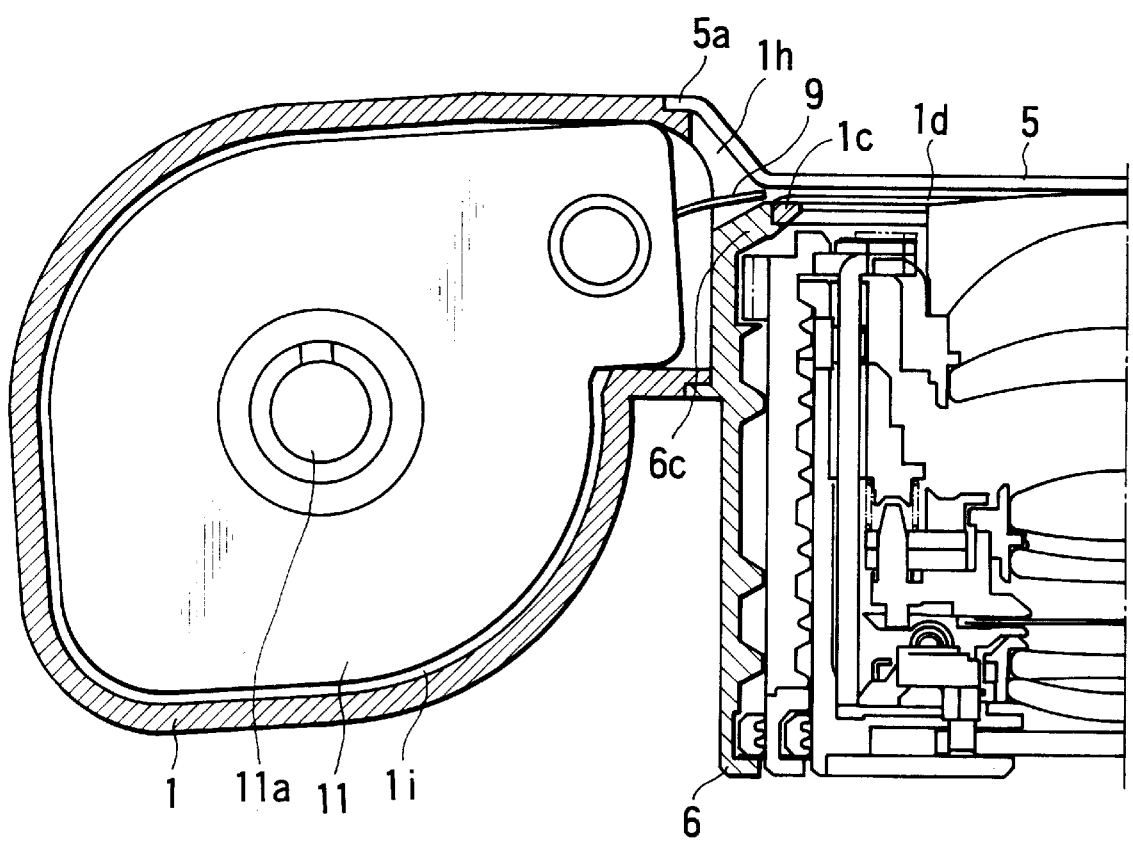
FIG. 4 is a transverse sectional view showing a camera according to a third embodiment of this invention.
Figure 6:
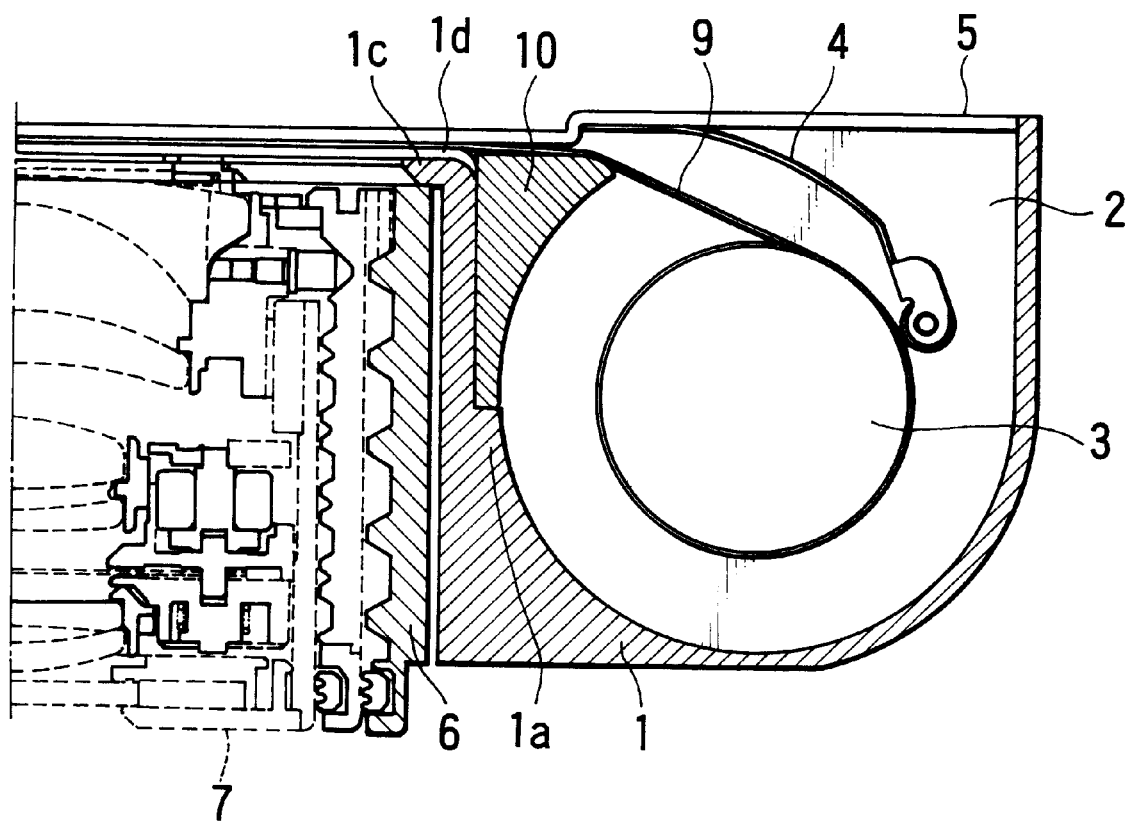
FIG. 6 is a transverse sectional view of a conventional camera having no camera-body-side roller spring.

FIG. 4 shows in a transverse sectional view a camera according to a third embodiment of this invention. The parts of the third embodiment arranged in the same manner as those of the first embodiment shown in FIG. 1 are indicated by the same reference numerals as those of FIG. 1.

Referring to FIG. 4, the camera body 1 is provided with a cartridge chamber 1i arranged to stow therein a film cartridge 11 The film cartridge 11 is provided with an inner spool 11a which has a photographing film 9 wound thereon. The fixed tube 6 has a cartridge chamber wall part 6c which constitutes, in conjunction with a gate part 1h of the camera body 1 and a gate part 5a of the back cover 5, a part of the wall surrounding the cartridge chamber 11 and a film sending-out gate part for sending the photographing film 9 out from the cartridge chamber 11 to the aperture part 1c of the camera body 1. The back cover 5 is provided with a groove along which the photographing film 9 is transported. The aperture part 1c is formed in the camera body 1 to define a range within which the film is to be exposed to light. The inner rail 1d is also formed integrally with the camera body 1.

With the camera configured in the above-stated manner, when the spool 11a disposed within the film cartridge 11 is driven by a film transport means (not shown), the photographing film 9 is then sent out from the film sending-out gate part. The photographing film 9 is stopped from traveling when a desired part of the photographing film 9 reaches the aperture part 1c through the film transport groove constituted by the back cover 5 and the camera body 1.

In each of the embodiments described above, at least a part of the spool chamber or the cartridge chamber is constituted by a lens barrel forming member, and the inner rail which is provided for setting the position of the film in the direction of the optical axis at the aperture part is constituted by the camera body. Compared with the conventional camera in which the spool chamber wall and the lens barrel forming member are arranged side by side, the arrangement of each of the embodiments described above permits a reduction in size in the transverse direction (in the film transport direction) of the camera. In addition, a positioning accuracy of the film in the direction of the optical axis at the aperture part can be assured.

Further, according to the arrangement of each of the embodiments described above, a camera of the kind having a pressing means for pressing a film against a spool is arranged to have the pressing means mounted on a lens barrel forming member. The arrangement enables the camera to have the pressing means disposed closer to the wall of the spool chamber than in the conventional camera, so that the transverse dimension of the camera can be further reduced. Further, since the lens barrel forming member can be embedded in the camera body in a state of having the pressing means mounted thereon beforehand by press-fitting or the like, assembly work on the camera can be facilitated.

The retreating part prearranged in the lens barrel forming member so as to allow the pressing means to retreat into the retreating part in the advanced stage of winding the film around the spool effectively prevents the width of the spool chamber, i.e., the transverse dimension of the camera, from being increased to secure a sufficient space for the moving range of the pressing means.

In each of the embodiments described above, the camera body is formed to include a guide part which protrudes into the spool chamber for guiding the film to the spool. The assembly work can be simplified by forming the guide part in this manner, compared with a case where a discretely formed guide part is to be mounted on the camera body.

The individual components shown in schematic or block form in the drawings are all well known in the camera arts and their specific construction and operation are not critical to the operation or best mode for carrying out this invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the camera-body-side roller spring 8 is arranged to be mounted by press-fitting in each of the embodiments described above, the arrangement may be changed to mount the camera-body-side roller spring 8 with a screw, by caulking or by some other suitable fixing means.

Further, in the first or second embodiment described above, the rib 1e and the inner rail extension part 1f extend to the full vertical length of the spool chamber 2 and have their upper and lower parts symmetrically formed to protrude into the spool chamber 2. However, in accordance with this invention, these parts may be arranged to have their upper and lower parts shaped asymmetric. Each of them may be arranged to include only a part of what is disclosed, including only an upper part, a lower part or a middle part. A plurality of each of them may be arranged in shapes differing from each other. In other words, the rib 1e and the inner rail extension part 1f may be arranged in any suitable shapes as desired so long as they protrude into the spool chamber 2.

A part of the spool chamber wall or a part of the cartridge chamber wall is constituted by the fixed tube part of the lens barrel in each of the embodiments described above. In accordance with this invention, however, they may be constituted by some part of the lens barrel other than the fixed tube.

Further, in accordance with this invention, the lens barrel may be used either as a part of the spool chamber wall or as a part of the cartridge chamber wall or may be used both as a part of the spool chamber wall and as a part of the cartridge chamber wall.

While a part of the spool chamber wall or a part of the cartridge chamber wall is arranged to be formed by using the photo-taking lens barrel in each of the embodiments described above, this invention is not limited to the disclosed arrangement but applies also to a case where a part of the chamber wall is arranged to be formed by using a viewfinder lens barrel or some other lens barrel.

In each of the embodiments described above, the spool chamber and the cartridge chamber are disposed on the right and left sides of the camera body. However, this invention is applicable also to a case where these chambers are formed on the upper and lower sides of the camera body. In such a case, the vertical dimension of the camera also can be lessened in accordance with the arrangement of this invention.

This invention likewise applies also to a case where a recording medium other than a photographing film is employed.

This invention may be carried out by combining as necessary the embodiments or their technological elements disclosed in the foregoing.

This invention applies to cases where either the whole or a part of claims or the arrangement of each of the embodiments described above forms one apparatus or is used in combination with some other apparatus or as a component element of an apparatus.

This invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

I claim:

1. A camera comprising:
    a) a cartridge chamber for loading therein an image recording medium cartridge;
    b) an image recording medium accommodating chamber for accommodating therein an image recording medium sent out from the image recording medium cartridge;
    c) a lens barrel constituting a part of at least one wall of a wall constituting said cartridge chamber and a wall constituting said image recording medium accommodating chamber; and
    d) a positioning portion for positioning the image recording medium at a photo-taking aperture position, said positioning portion being molded integrally with a camera body.

2. A camera according to claim 1, wherein the image recording medium includes a film.

3. A camera according to claim 1, wherein said image recording medium accommodating chamber includes a take-up spool for taking up thereonto the image recording medium sent out from the image recording medium cartridge.

4. A camera according to claim 1, wherein said lens barrel includes a fixed tube.

5. A camera according to claim 1, wherein said lens barrel includes a photo-taking lens barrel.

6. A camera according to claim 1, wherein said positioning portion includes a member for positioning the image recording medium in a photo-taking optical axis direction.

7. A camera according to claim 1, wherein said positioning portion includes an inner rail for positioning the image recording medium in a photo-taking optical axis direction.

8. A camera according to claim 1, further comprising a guide portion which guides the image recording medium, said guide portion being provided at said lens barrel.

9. A camera according to claim 8, wherein said lens barrel includes a recessed portion for holding said guide portion.

10. A camera according to claim 8, wherein said lens barrel includes a holding portion for holding said guide portion between said lens barrel and said camera body.

11. A camera according to claim 8, wherein said lens barrel includes a retreating portion for allowing said guide portion to move.

12. A camera according to claim 1, further comprising a guide portion, protruding into said image recording medium accommodating chamber, for guiding to said image recording medium accommodating chamber the image recording medium sent out from the image recording medium cartridge, said guide portion being molded integrally with said camera body.

13. A camera according to claim 1, further comprising a light-blocking portion protruding into said image recording medium accommodating chamber, said light-blocking portion being molded integrally with said camera body.

14. A camera according to claim 1, further comprising a light-blocking portion overlapping said lens barrel, said light-blocking portion being molded integrally with said camera body.

* * * * *

UNITED STATES PATENT AND TRADEMARK OFFICE
CERTIFICATE OF CORRECTION

PATENT NO. : 6,006,044
DATED : December 21, 1999
INVENTOR(S) : Ryoji Okuno

It is certified that error appears in the above-identified patent and that said Letters Patent are hereby corrected as shown below:

Col. 4, line 29, delete "3and" and insert -- 4 and --.
Col. 5, line 20, after "cartridge 11" insert -- . --.
Col. 6, line 40, delete "asymmetric" and insert -- asymmetrically --.

Signed and Sealed this

Seventeenth Day of April, 2001

Attest:

NICHOLAS P. GODICI

Attesting Officer     Acting Director of the United States Patent and Trademark Office